(12) United States Patent
Chen et al.

(10) Patent No.: US 10,074,005 B2
(45) Date of Patent: Sep. 11, 2018

(54) VASCULAR PATTERN DETECTION SYSTEMS

(71) Applicant: Hewlett Packard Enterprise Development LP, Houston, TX (US)

(72) Inventors: Chin-Hui Chen, Palo Alto, CA (US); Tsung-Ching Huang, Palo Alto, CA (US); Zhihong Huang, Palo Alto, CA (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 69 days.

(21) Appl. No.: 15/179,156

(22) Filed: Jun. 10, 2016

(65) Prior Publication Data
US 2017/0357843 A1 Dec. 14, 2017

(51) Int. Cl.
*G06K 9/00* (2006.01)

(52) U.S. Cl.
CPC ..... *G06K 9/00087* (2013.01); *G06K 9/00013* (2013.01); *G06K 9/00114* (2013.01); *G06K 9/00885* (2013.01)

(58) Field of Classification Search
None
See application file for complete search history.

(56) References Cited

U.S. PATENT DOCUMENTS

| | | | | |
|---|---|---|---|---|
| 4,582,985 A | * | 4/1986 | Lofberg | G07F 7/1008 235/380 |
| 5,177,802 A | * | 1/1993 | Fujimoto | A61B 5/1172 356/71 |
| 6,576,490 B2 | * | 6/2003 | Buchanan | B82Y 20/00 257/E31.02 |
| 7,146,029 B2 | * | 12/2006 | Manansala | G06K 9/00026 382/126 |
| 7,245,745 B2 | * | 7/2007 | Nagasaka | G06K 9/00 382/115 |

(Continued)

FOREIGN PATENT DOCUMENTS

GB 2437557 A 10/2007

OTHER PUBLICATIONS

A integrated approach to provide security and resist thefts on digital data, S. Mahaboob Hussain et al., IJACCC 020404, 2014, pp. 139-147.*

(Continued)

*Primary Examiner* — Jayesh A Patel
(74) *Attorney, Agent, or Firm* — Hewlett Packard Enterprise Patent Department

(57) ABSTRACT

In the examples provided herein, a vascular pattern recognition system integrated onto a portable card includes a vascular pattern detection system to obtain image data of blood vessels of a finger to be swiped across a detection area on the portable card, wherein the vascular pattern detection system includes a near infrared light source and an image sensor array. The vascular pattern recognition system also includes an image processor to process the image data to generate a scanned vascular pattern and compare the scanned vascular pattern to a pre-stored pattern stored on the portable card to authenticate the image data, and a security processor to generate a transaction code to authorize a transaction upon authentication of the image data.

9 Claims, 7 Drawing Sheets

(56) References Cited

U.S. PATENT DOCUMENTS

| | | | | |
|---|---|---|---|---|
| 7,623,689 B2* | 11/2009 | Shigeta | G06K 9/0004 | 283/68 |
| 7,873,408 B2* | 1/2011 | Sato | A61B 5/1171 | 600/476 |
| 7,917,769 B2 | 3/2011 | Campisi | | |
| 8,016,191 B2 | 9/2011 | Bonalle et al. | | |
| 8,175,345 B2* | 5/2012 | Gardner | G06K 9/00026 | 382/103 |
| 8,180,122 B2* | 5/2012 | Allen | G06K 9/00919 | 382/126 |
| 8,204,284 B2* | 6/2012 | Wu | G06K 9/00046 | 382/100 |
| 8,229,184 B2* | 7/2012 | Benkley | G06K 9/00026 | 382/124 |
| 8,276,816 B2* | 10/2012 | Gardner | G06K 9/00026 | 235/380 |
| 8,340,362 B2* | 12/2012 | Arai | G06K 9/0004 | 382/115 |
| 9,037,851 B2 | 5/2015 | Choi | | |
| 9,619,690 B2* | 4/2017 | Higuchi | A61B 5/1171 | |
| 2002/0106115 A1* | 8/2002 | Rajbenbach | G06K 9/00013 | 382/126 |
| 2002/0172402 A1* | 11/2002 | O'Gorman | A61B 5/1172 | 382/126 |
| 2003/0016345 A1* | 1/2003 | Nagasaka | G06K 9/00013 | 356/71 |
| 2003/0103686 A1* | 6/2003 | Ogura | G06K 9/00013 | 382/321 |
| 2004/0208348 A1* | 10/2004 | Baharav | G06F 3/0421 | 382/124 |
| 2005/0240778 A1* | 10/2005 | Saito | G06K 19/0723 | 713/186 |
| 2006/0093192 A1* | 5/2006 | Bechtel | G06K 9/00013 | 382/126 |
| 2007/0057929 A1* | 3/2007 | Xie | G06F 3/03547 | 345/175 |
| 2007/0215793 A1* | 9/2007 | Gruhlke | G06F 3/0421 | 250/221 |
| 2007/0253607 A1* | 11/2007 | Higuchi | G06K 9/00026 | 382/124 |
| 2008/0159599 A1* | 7/2008 | Kajihara | G06K 9/00046 | 382/115 |
| 2008/0205711 A1* | 8/2008 | Kishigami | G06K 9/0004 | 382/115 |
| 2009/0092291 A1* | 4/2009 | Nagasaka | G07C 9/00158 | 382/115 |
| 2009/0161920 A1* | 6/2009 | Kan | G06K 9/0004 | 382/115 |
| 2010/0046807 A1* | 2/2010 | Sato | G06K 9/2027 | 382/115 |
| 2010/0080422 A1* | 4/2010 | Sato | G06K 9/0004 | 382/115 |
| 2010/0110170 A1* | 5/2010 | Bringer | G06K 9/00046 | 348/77 |
| 2010/0231125 A1* | 9/2010 | Li | C09K 11/06 | 313/504 |
| 2012/0026093 A1* | 2/2012 | Duparre | G06F 3/03547 | 345/166 |
| 2012/0070043 A1* | 3/2012 | Higuchi | A61B 5/1172 | 382/124 |
| 2013/0336546 A1* | 12/2013 | Pritikin | G06K 9/00892 | 382/116 |
| 2014/0023249 A1* | 1/2014 | Higuchi | G06K 9/00046 | 382/127 |
| 2014/0084059 A1 | 3/2014 | Sierchio et al. | | |
| 2015/0268450 A1* | 9/2015 | Ueno | G02B 13/0015 | 348/360 |
| 2016/0132737 A1* | 5/2016 | Bechtel | G06K 9/00013 | 382/126 |

OTHER PUBLICATIONS

Smart Card Tutorial—Part I, 1992, pp. 1-163.*

Hussain, S.M. et al., An Integrated Approach to Provide Security and Resist Thefts on Digital Data, (Research Paper), International Journal of Advanced Computer Communications and Control, vol. 2, No. 4, Oct. 2014, pp. 139-147, available at http://basharesearch.com/IJACCC/4020404.pdf.

Suwald, T., "Smartcards, Security, and Biometrics," (Research Paper), NXP Semiconductors, Oct. 7, 2014, 20 pages, available at http://www.nxp.com/documents/other/Biometrics_WP_HR_fv.pdf.

* cited by examiner

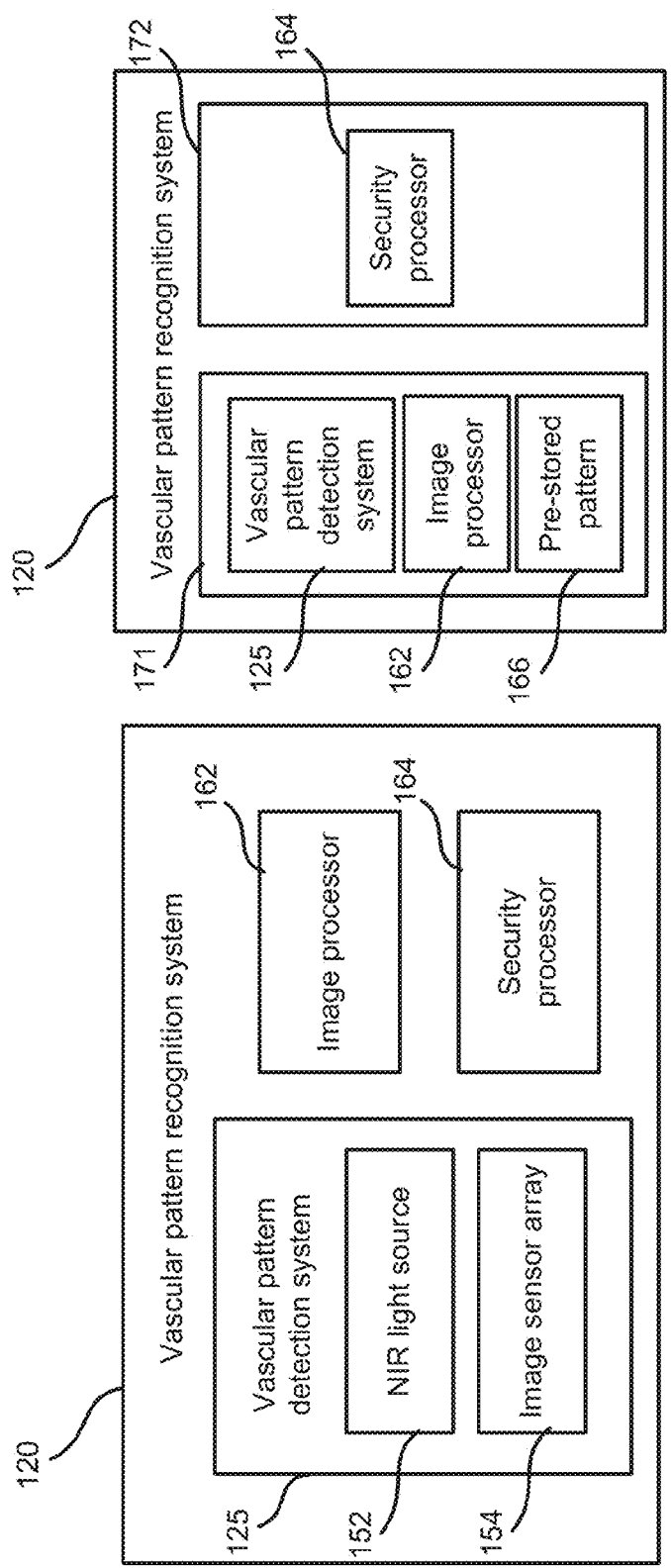

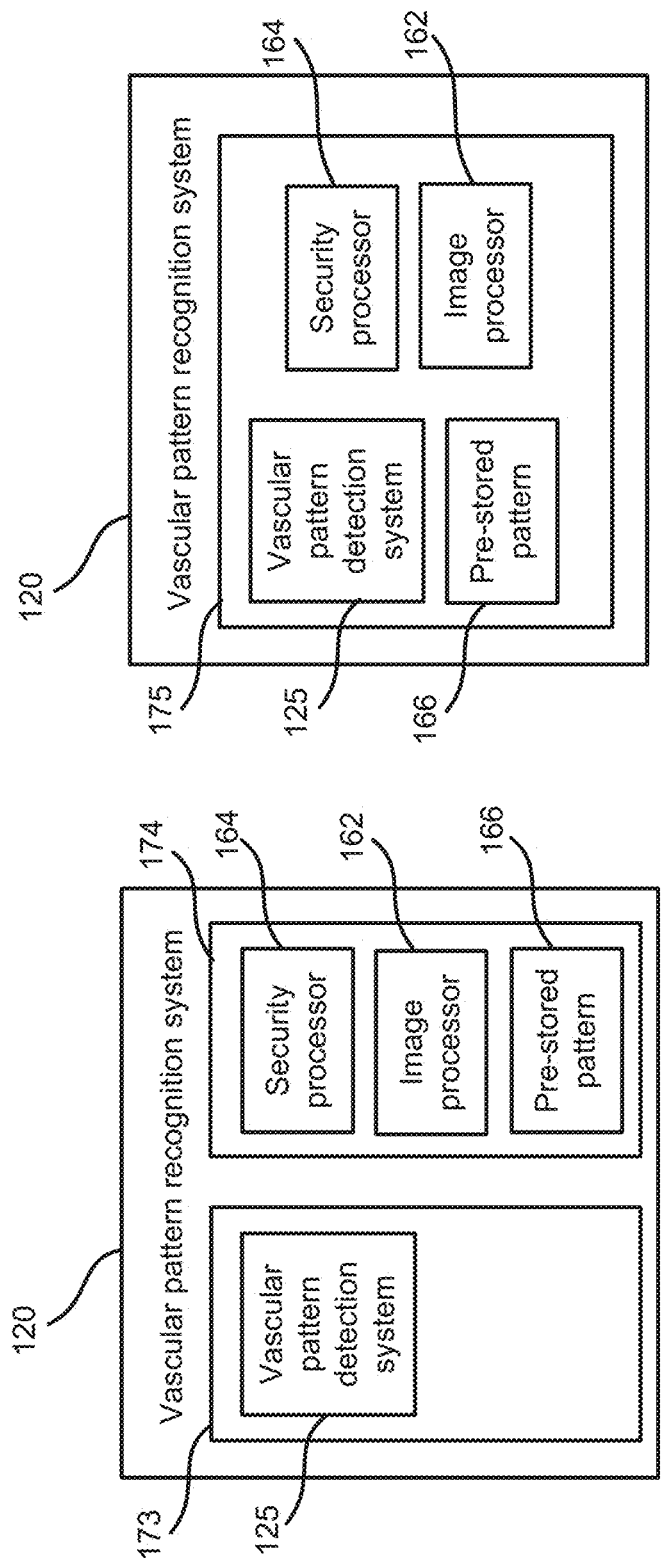

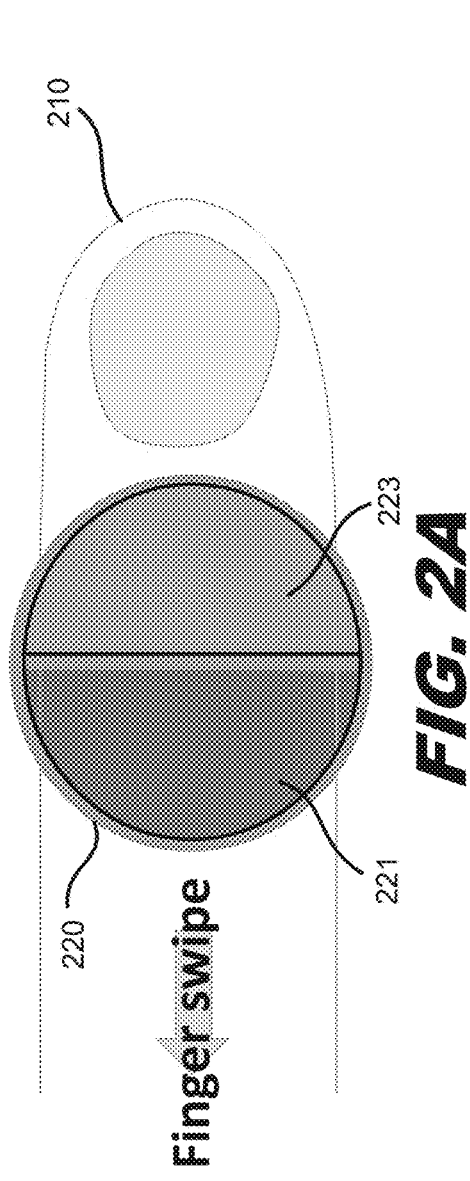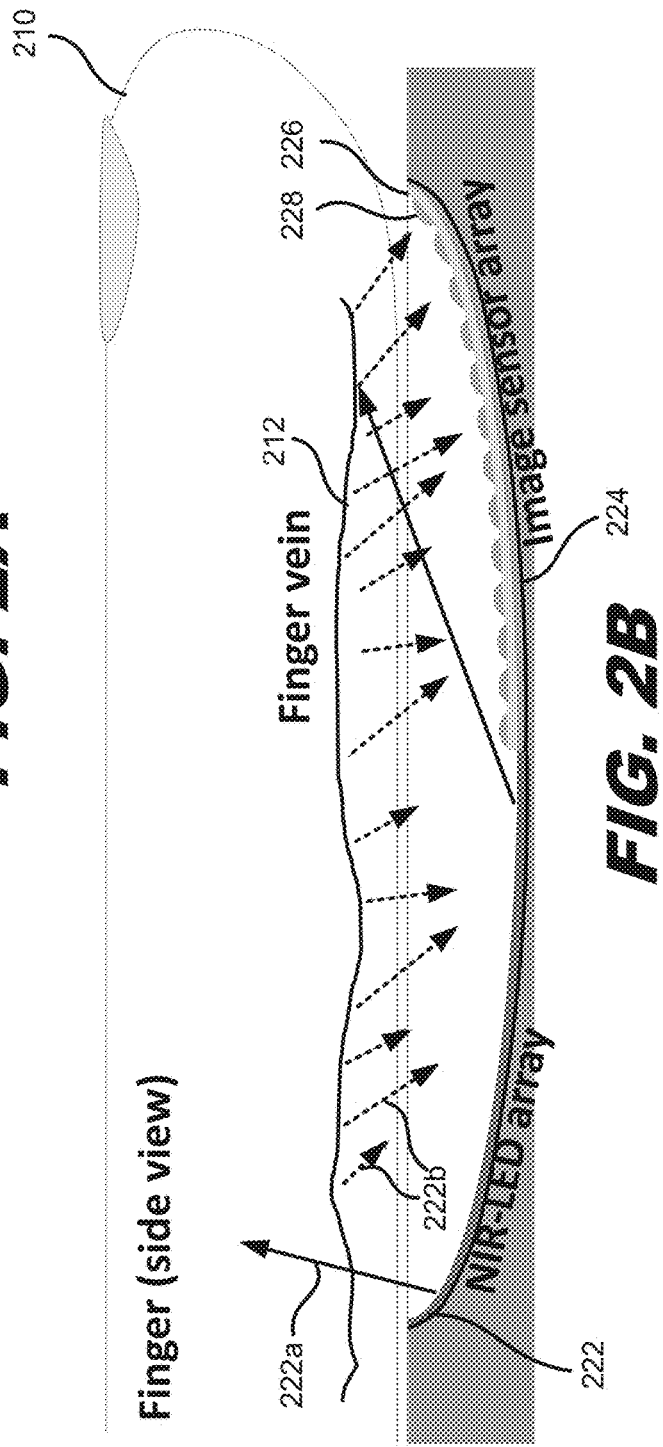

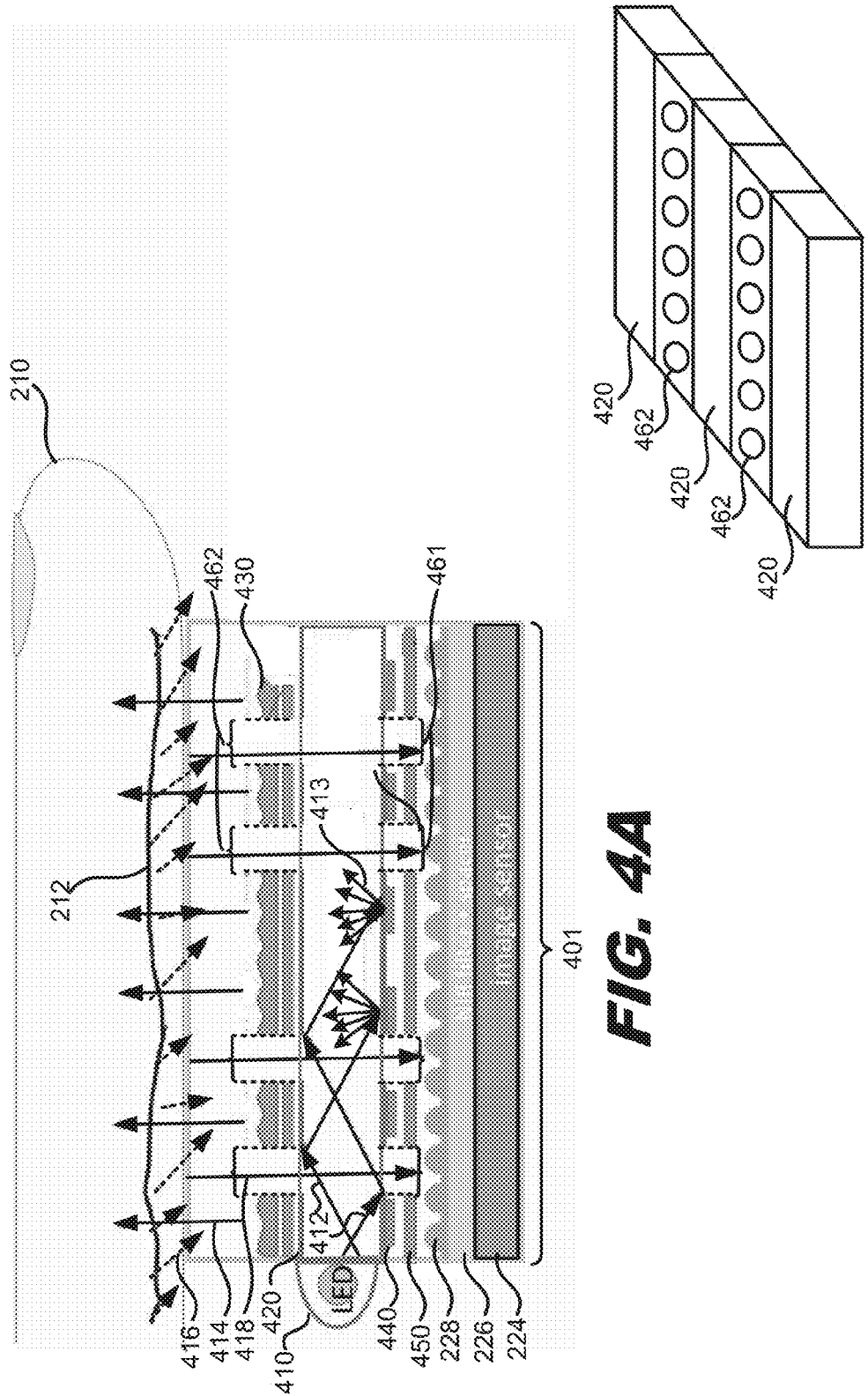

VASCULAR PATTERN DETECTION SYSTEMS

BACKGROUND

Payment card fraud costs financial institutions many billions of dollars a year and impacts tens of millions of consumers a year. Currently, payment cards use either a personal identification number (PIN) or a password for authentication purposes. However, PINs and passwords can be hacked and are widely regarded as the weakest link in security for these cards.

BRIEF DESCRIPTION OF THE DRAWINGS

The accompanying drawings illustrate various examples of the principles described below. The examples and drawings are illustrative rather than limiting.

FIG. 1B-1E depict examples of vascular pattern recognition systems.

FIG. 2A depicts a top view of an example detection region on a portable card used with a vascular pattern recognition system.

FIG. 2B depicts a side view of an example vascular pattern detection system.

FIG. 4A depicts a side view of an example vascular pattern detection system.

FIG. 4B depicts an isometric view of an example vascular pattern detection system.

DETAILED DESCRIPTION

Vascular pattern recognition is a highly secure biometric authentication method that uses the unique blood vessel patterns in a user's finger or palm as a means of identification. An image of the user's blood vessels may be pre-registered and stored for comparison at a later time to a real-time image of the living blood vessels of the user to identify the user. Because living blood vessels are used for user authentication, it would be extremely difficult to deceive a vascular pattern recognition system. While vascular pattern recognition systems have been used to authenticate a user's identity, known systems are expensive and bulky.

Described below are vascular pattern recognition systems for portable secure cards, such as credit cards and smart badges, having a thickness of less than approximately two millimeters. The system uses flexible hybrid electronics and photonics technology to integrate a compact finger vascular pattern detection and authentication system on the card, resulting in a card that provides enhanced security protection compared to personal identification number (PIN) or signature security systems.

Figure 1A:
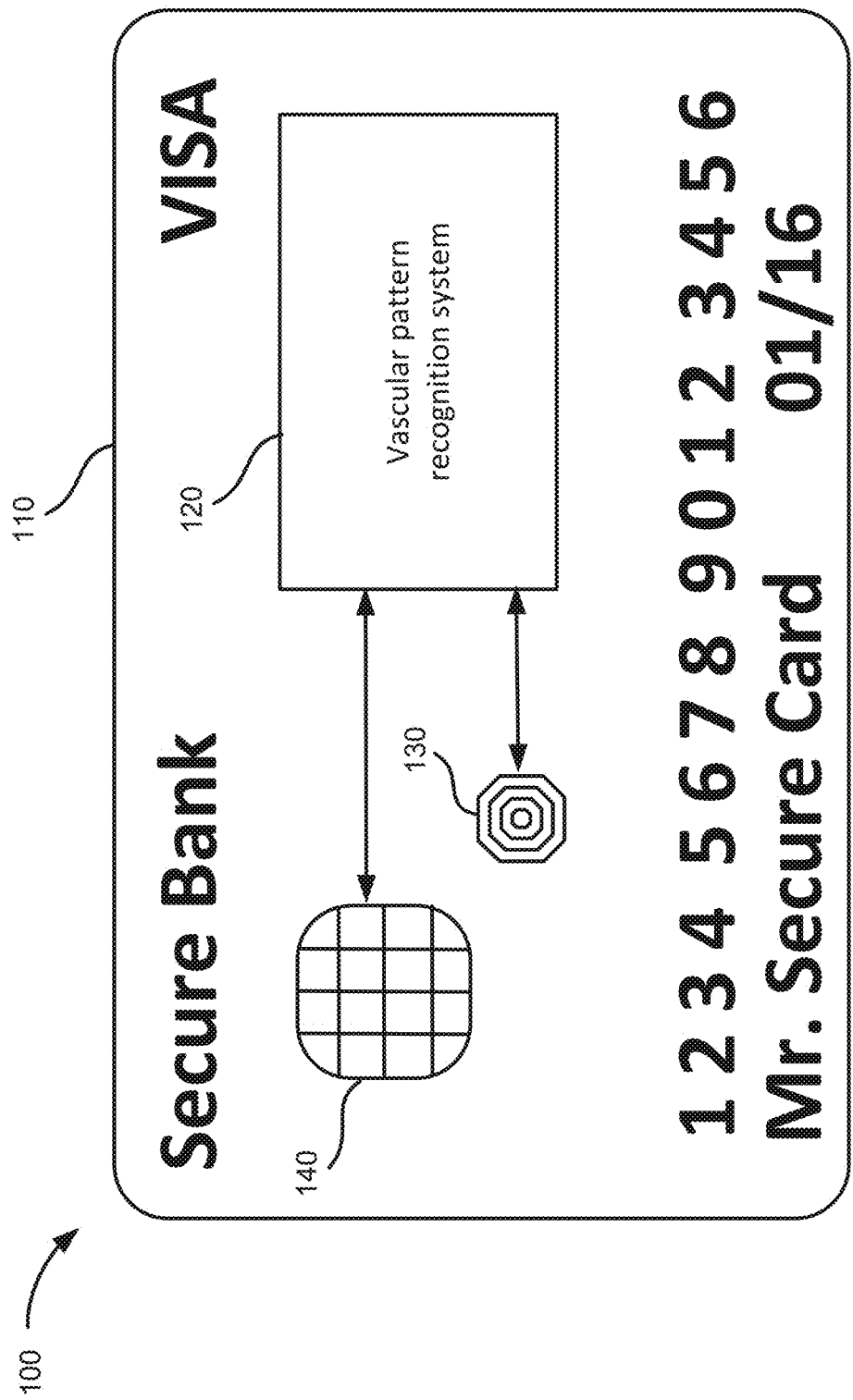
FIG. 1A depicts an example portable card that includes a vascular pattern recognition system as described herein.

FIG. 1A depicts an example portable card 100 that includes a vascular pattern recognition system 120. The portable card 100 may be a secure card used in conjunction with an authentication and authorization system, such as may be used with a credit card or smart badge. The vascular pattern recognition system 120 may communicate with a card reader (not shown) contactlessly via a near field communication (NFC) antenna 130 or using a contact method via a smart chip 140. Communications from the vascular pattern recognition system 120 to the card reader may include an authorization code upon confirmation of the identity of the user of the portable card 100 based on the user's finger vascular pattern. In some implementations, the portable card 100 is thin, having a thickness of approximately two millimeters or less. Further, the vascular pattern recognition system 120 integrated on the portable card 100 also has a thickness of approximately two millimeters or less. In some implementations, the vascular pattern recognition system may have an area on the portable card 100 that is approximately 25×30 mm$^2$ or smaller.

As shown in the example of FIG. 1B, a vascular pattern recognition system 120 may include a vascular pattern detection system 125, an image processor 162 and a security processor 164. The vascular pattern detection system 125 can obtain image data of blood vessels of a finger to be swiped across a detection area on the portable card. The vascular pattern detection system 125 may include a near infrared (NIR) light source 152 and an image sensor array 154. The light source 152 should emit in the NIR, within a wavelength range of approximately 800 nm to 1000 nm. At these wavelengths, the light is transmitted through human tissue, ie, the skin, but is absorbed and scattered by the blood in the blood vessels. In some implementations, the light source 152 may be light-emitting diodes (LEDs), such as GaAs and organic LEDs, which can emit light in the NIR wavelength range. In some implementations, the image sensor array 154 may be a complementary metal-oxide semiconductor (CMOS) image sensor array, and in other implementations, the image sensor array 154 may be a printed thin-film transistor-based photodiode image sensor array.

The image processor 162 processes the image data obtained by the vascular pattern detection system 125 to generate a scanned vascular pattern. For example, in some implementations, the image sensor array 154 may have a length smaller than a length of a person's fingertip where the vascular pattern is located because a smaller image sensor array 154 is more cost effective. Thus, the width of the image sensor array 154 may be approximately an adult finger width across, approximately 2-3 cm, while the length of the image sensor array 154 may be shorter than the width. In this situation, as a person swipes a finger across the detection area on the portable card, the obtained image data may include a series of images of the finger's vascular pattern, and the image processor 162 may use an image stitching algorithm on the series of images to stitch together the scanned images to generate a scanned vascular pattern. A similar stitching algorithm is used for scanning finger fingerprints. Further, the image processor 162 compares the scanned vascular pattern, which may be a stitched vascular pattern, to a pre-stored pattern stored in a memory location on the portable card to authenticate the image data. Scanned vascular pattern data may include relative locations of blood vessel branching points, blood vessel thickness, and blood vessel branching angles. The pre-stored pattern may be a pre-registered image data of a vascular pattern of an authorized user.

The security processor 164 generates a transaction or authentication code to authorize a transaction upon authentication of the image data, where the transaction code is transmitted through a contact method with a card reader or contactlessly via NFC.

The vascular pattern detection system 125, the image processor 162, and the security processor 164 may be implemented using a one-chip or a two-chip system. A one-chip system may be beneficial because the elements on the chip may be integrated together into a smaller area, providing a reduction in a lower cost design. A two-chip system may have a different benefit, where the financial institution that issues the card, such as a credit card issuer, may generate its own security chip with a security processor, and the non-secure portion, such as the vascular pattern detection system 125, may be manufactured by a different manufacturer. FIG. 1C-1E depict examples of vascular pattern recognition systems 120.

FIG. 1C depicts an example of a two-chip system where the vascular pattern detection system 125 and the image processor 162 are part of a first chip 171 on the portable card, and the security processor 164 is part of a second chip 172 on the portable card. The pre-stored pattern 166 may be stored on the first chip 171. The first chip 171 and the second chip 172 are distinct and communicatively coupled. The image processor 162 processes the image data obtained by the vascular pattern detection system 125, and the image processor 162 sends an indication of authentication of the image data to the security processor 164. Thus, if the user's vascular pattern matches the pre-stored pattern, the security processor 164 may generate a transaction code.

FIG. 1D depicts an example of a two-chip system where the vascular pattern detection system 125 is part of a first chip 173 on the portable card, and the security processor 164 and the image processor 162 are part of a second chip 174 on the portable card. The pre-stored pattern 166 may be stored on the second chip 174. The first chip 173 and the second chip 174 are distinct and communicatively coupled. The image data obtained by the vascular pattern detection system 125 is transmitted to the image processor 162 for processing, and the image processor 162 sends an indication of authentication of the image data to the security processor 164.

FIG. 1E depicts an example of a one-chip system where the vascular pattern detection system 125, the image processor 162, and the security processor 164 are part of a single chip 175 on the portable card, and the pre-stored pattern 166 is stored on the single chip 175. The image processor 162 processes the image data obtained by the vascular pattern detection system 125, and the image processor 162 sends an indication of authentication of the image data to the security processor 164.

Figure 3A:
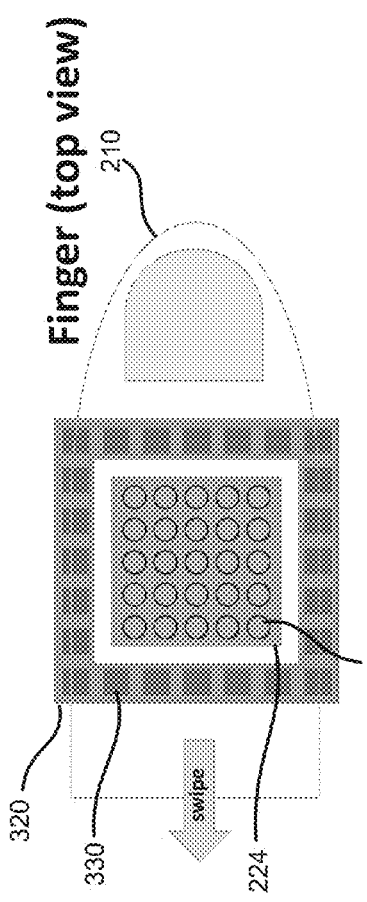
FIG. 3A depicts a top view of an example detection region on a portable card used with a vascular pattern recognition system.

FIGS. 2A and 3A each show a top view of examples of detection regions 220, 320 on a portable card to be used with a vascular pattern detection system. In some implementations, the detection region 220, 320 may be a recessed region. A user's finger 210 is to be swiped across a length of the detection region 220, 320 such that a vascular pattern of the finger's blood vessels 212 may be detected and authenticated by the vascular pattern recognition system. In the example of FIG. 2A, the detection region 220 is round, having a diameter approximately a finger's width across. The recessed region may have a first sloping edge 221 along the width on a first side and a second sloping edge 223 along the width on a second side opposite the first side. In the example of FIG. 3A, the detection region 320 is square, where the length of each side is approximately a finger's width across. However, the detection region 220, 320 may be any shape and size, such as a rectangle having a width approximately a finger's width across and a length shorter than the width.

Figure 3B:
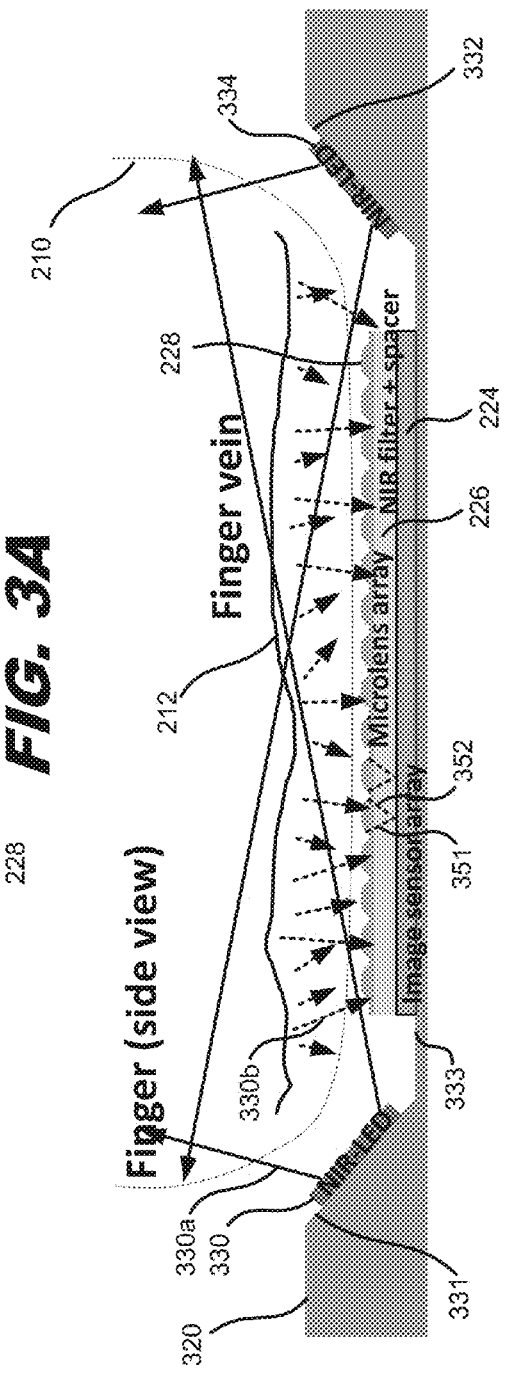
FIG. 3B depicts a side view of another example vascular pattern detection system.

FIGS. 2B and 3B each show a side view of a vascular pattern detection system based on lateral placement of a NIR light source and an image sensor array. FIG. 2B depicts a side view of an example vascular pattern detection system that includes a first NIR LED array 222 positioned along the first sloping edge 221 and an image sensor array 224 to receive light emitted by the first NIR LED array (representative solid line ray 222a) and scattered (representative dotted line rays 222b) from blood vessels of a finger to be swiped along the length of the recessed region 220. In some implementations, the image sensor array 224 is positioned on the second sloping edge 223 of the recessed region, as shown in the example of FIG. 2B.

In some implementations, the image sensor array 224 may be positioned, as shown in the example of FIG. 3B, where an example vascular pattern detection system includes a recessed region 320. A first NIR LED array 330 is positioned along the first sloping edge 331 of the recessed region 320, and an image sensor array 224 is positioned at a bottom 333 of the recessed region 320 to receive light emitted by the first NIR LED array (representative ray 330a) and scattered (representative rays 330b) from blood vessels of a finger to be swiped along the length of the recessed region 320. Further, a second NIR LED array 334 may be positioned along a second sloping edge 332 of the recessed region 320, where the image sensor array 224 further receives light emitted by the second NIR LED 334 array and scattered from the blood vessels of the finger 210. As shown in the example of FIG. 3A, the recessed region 320 may have other NIR LED arrays around the perimeter to illuminate the finger 320 to be swiped across the recess region 320.

Additionally, for either configuration in the examples of FIGS. 2B and 3B, a NIR filter and spacer 226 may be positioned over the image sensor array 224, and a microlens array 228 may be positioned over the NIR filter and spacer 226. The NIR filter and spacer 226 blocks wavelengths of light that are not within the range of wavelengths emitted by the NIR LED arrays 222, 330, 334 because the image sensor array 224 is sensitive to other wavelengths of light, such as ambient light, that may interfere with the desired image data of the vascular pattern to be detected. Additionally, the NIR filter and spacer 226 provides a pre-defined focusing distance between the microlenses in the microlens array 228 and the pixels of the image sensor array 224, as shown by the representative rays 351, 352 in the example of FIG. 3B.

Figure 5A:
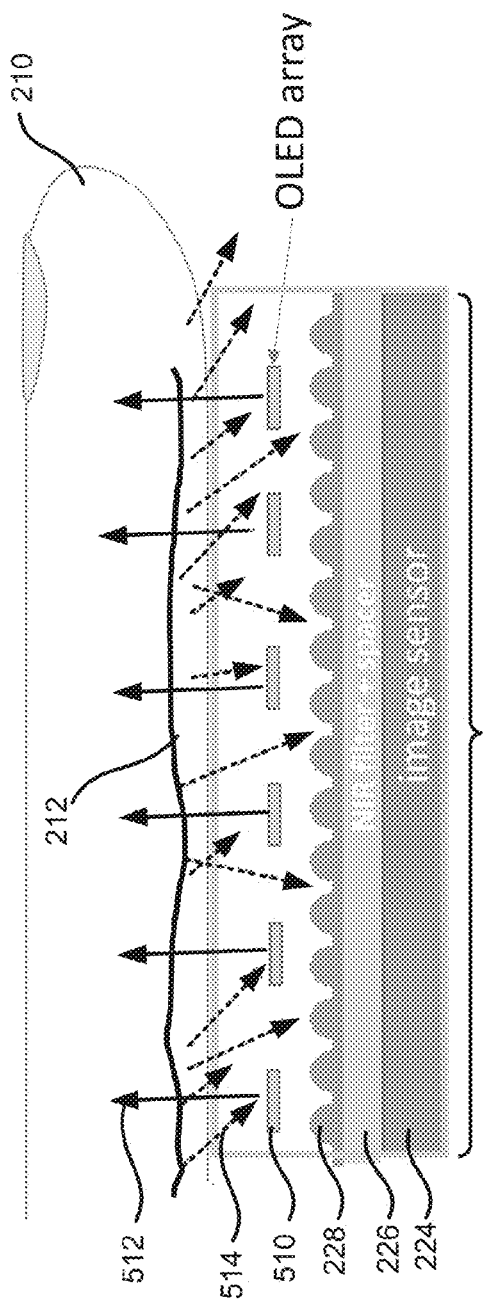
FIG. 5A depicts a side view of an example vascular pattern detection system.

FIGS. 4A and 5A each depict a side view of an example vascular pattern detection system based on vertical placement of a NIR light source and an image sensor array. FIG. 4A depicts a side view of an example vascular pattern detection system that includes a scanning area having a width approximately a finger's width across and a length 401 that may be shorter than the width. The vascular pattern detection system also includes an image sensor array 224 within the scanning area. As described above, a NIR filter and spacer 226 is positioned over the image sensor array 224, and a microlens array 228 is positioned over the NIR filter and spacer 226. There is also a NIR light source to emit light above the microlens array 228 toward a finger 210 to be swiped along the length of the scanning area, where the image sensor array 224 receives light emitted by the NIR light source and scattered from blood vessels 212 of the finger 210.

In some implementations, as shown in the example of FIG. 4A, the NIR light source includes an edge emitting LED 410 and a light guide 420 positioned over a portion of the microlens array 228, where light emitted by the edge emitting LED 410 (representative rays 412) couples into the light guide 420 and travels along the light guide 420 via total internal reflection. There may be more than one edge emitting LED 410 that emits light that couples into the light guide 420. Further, there may be multiple light guides 420, such as shown in the example of FIG. 4B, an isometric view of the example vascular pattern detection system.

Returning to FIG. 4A, light scatterers 440 are positioned outside the light guide 420 on a first surface closest to the microlens array 228 to scatter light (representative ray 413) in the light guide 420 toward the finger 210, where the light scatterers 440 are positioned around a first pinhole array 461 on a surface of the light guide 420 closer to the image sensor array 224 than the finger 210. A second pinhole array 462 may be positioned on an opposite surface of the light guide 420, closer to where the finger 210 may be swiped across the scanning area. The second pinhole array 462 is aligned with the first pinhole array 461, such that the aligned pinhole arrays 461, 462 direct light scattered from the blood vessels 212 (representative dotted line rays 416) to pixels of the image sensor array 224 (representative rays 418). There may be multiple pinhole arrays to allow light to be channeled to the image sensor array 224, as shown in the isometric view of FIG. 4B. Further, pinhole arrays 462, 461 may be interleaved with light guides 420 to allow light from the various light guides 420 to be directed to the pixels of the image sensor array 224. Additionally, because the pinhole arrays 461, 462 are spaced a distance apart, angle sensitive data may be derived from the light received by the image sensor array 224 and used to generate a three-dimensional image of the blood vessels of the finger, not merely a two-dimensional image.

In some implementations, a diffuser layer 430 is positioned between the emitted light 412 from the NIR light source and the finger 210 to be scanned. The diffuser layer 430 collimates light from the light scatterers 440 (representative rays 414), and the diffuser layer 430 is positioned around the second pinhole array 462.

In some implementations, a reflection film 450 may be adhered to a surface of the light scatterers 440 away from the light guide 420. The reflection film 450 is a polarized reflecting plane that transmits light from the vertical direction while reflecting light from other directions. As a result, light is scattered in all directions from the light scatterers 440 toward the finger, while light traveling vertically downward 224 from the blood vessel 212 is permitted to pass through to the image sensor array 224.

FIG. 5A depicts a side view of an example vascular pattern detection system. Similar to FIG. 4A, the vascular pattern detection system includes a scanning area having a width approximately a finger's width across and a length 501 that may be shorter than the width. As with the other example vascular detect systems, the vascular pattern detection system also includes an image sensor array 224 within the scanning area, a NIR filter and spacer 226 positioned over the image sensor array 224, and a microlens array 228 positioned over the NIR filter and spacer 226. The NIR light source that emits light above the microlens array 228 toward a finger 210 to be swiped along the length of the scanning area may be an organic light-emitting diode (OLED) array 510 positioned above the microlens array 228. The OLED array 510 emits light (representative solid line rays 512) directly upward toward the finger 210 to be swiped across the scanning area, and the light is scattered (representative dotted line rays) from blood vessels 212 of the finger 210 to the image sensor array 224.

Figure 5B:
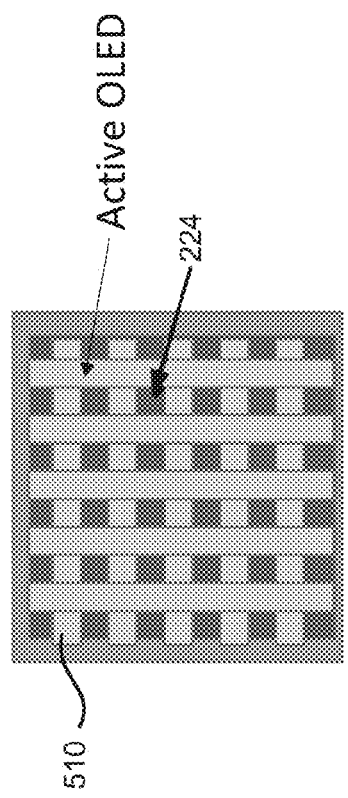
FIG. 5B depicts a top view of an example vascular pattern detection system.

FIG. 5B depicts a top view of the example vascular pattern detection system. The OLED array 510 emits light at the intersection of the parallel anodes in a first direction and the parallel cathodes in the perpendicular direction. The architecture of the OLED array 510 conveniently provides locations for the pixels of the image sensor array 224 to receive light scattered from the blood vessels 212.

As used in the specification and claims herein, the singular forms "a," "an," and "the" include plural referents unless the context clearly dictates otherwise.

What is claimed is:

1. A vascular pattern detection system on a portable card comprising:
    a recessed region having a width and a length shorter than the width, wherein the recessed region has a first sloping edge along the width on a first side and a second sloping edge along the width on a second side opposite the first side;
    a first near infrared (NIR) light-emitting diode (LED) array positioned along the first sloping edge;
    an image sensor array positioned on the second sloping edge of the recessed region, the image sensor array to receive light emitted by the first NIR LED array and scattered from blood vessels of a finger to be swiped along the width of the recessed region;
    a NIR filter and spacer positioned over the image sensor array;
    a microlens array positioned over the NIR filter and spacer; and
    an image processor to process image data from the image sensor array to generate a scanned vascular pattern and compare the scanned vascular pattern to a pre-stored pattern stored on the portable card to authenticate the image data.

2. The vascular pattern detection system of claim 1, further comprising: a security processor to generate a transaction code to authorize a transaction upon authentication of the image data, wherein the transaction code is transmitted through contact with a card reader or contactlessly via near field communication.

3. The vascular pattern detection system of claim 1, wherein the image data comprises a series of images, and further wherein processing the image data to generate a scanned vascular pattern comprises using an image stitching algorithm on the series of images to generate the scanned vascular pattern.

4. The vascular pattern detection system of claim 1, wherein the width of the recessed region is approximately a finger's width across.

5. A vascular pattern detection system on a portable card comprising:
    a scanning area having a width approximately a finger's width across and a length shorter than the width;
    an image sensor array within the scanning area;
    a near infrared (NIR) filter and spacer positioned over the image sensor array;
    a microlens array positioned over the NIR filter and spacer; and
    a NIR light source to emit light above the microlens array toward a finger to be swiped along the length of the scanning area, wherein the image sensor array receives light emitted by the NIR light source and scattered from blood vessels of the finger;
    wherein the NIR light source comprises:

an edge emitting light-emitting diode (LED);
a light guide positioned over a portion of the microlens array, wherein light emitted by the edge emitting LED couples into the light guide and travels along the light guide via total internal reflection;
light scatterers positioned outside the light guide on a first surface closest to the microlens array to scatter light from the light guide toward the finger, wherein the light scatterers are positioned around a first pinhole array;
a second pinhole array positioned over the light guide and aligned with the first pinhole array to direct light scattered from the blood vessels to pixels of the image sensor array,
wherein a two-dimensional or three-dimensional image of the blood vessels may be generated based on the received light.

6. The vascular pattern detection system of claim 5, further comprising:
a diffuser layer positioned between the emitted light from the NIR light source and the finger to be scanned, the diffuser layer to collimate light from the light scatterers, wherein the diffuser layer is positioned around the second pinhole array.

7. The vascular pattern detection system of claim 5, further comprising:
an image processor to process image data from the image sensor array to generate a scanned vascular pattern and compare the scanned vascular pattern to a pre-stored pattern stored on the portable card to authenticate the image data.

8. The vascular pattern detection system of claim 7, further comprising:
a security processor to generate a transaction code to authorize a transaction upon authentication of the image data, wherein the transaction code is transmitted through contact with a card reader or contactlessly via near field communication.

9. The vascular pattern detection system of claim 7, wherein the image data comprises a series of images, and further wherein processing the image data to generate a scanned vascular pattern comprises using an image stitching algorithm on the series of images to generate the scanned vascular pattern.

* * * * *